United States Patent [19]

Mizushima et al.

[11] Patent Number: 5,066,110
[45] Date of Patent: Nov. 19, 1991

[54] LIQUID CRYSTAL DISPLAY APPARATUS

[75] Inventors: Shigeaki Mizushima, Ikoma; Eiichiro Nishimura, Nara; Seiji Fukami, Tenri; Ryuji Hashimoto, Tenri; Hisato Nagatomi, Tenri; Michihisa Onishi, Nara; Mitunobo Miyamoto; Shoji Mitamura, both of Tenri, all of Japan

[73] Assignee: Sharp Kabushiki Kaisha, Osaka, Japan

[21] Appl. No.: 454,781

[22] Filed: Dec. 22, 1989

[30] Foreign Application Priority Data

Dec. 26, 1988 [JP] Japan .................................. 63-328150
Feb. 20, 1989 [JP] Japan .................................. 1-41190
Oct. 23, 1989 [JP] Japan .................................. 1-276332

[51] Int. Cl.⁵ .............................................. G02F 4/43
[52] U.S. Cl. ....................................... 359/54; 357/23.7;
357/4; 359/76; 359/79
[58] Field of Search ............... 350/340, 341, 334, 336, 350/332; 357/23.7, 2, 4

[56] References Cited

U.S. PATENT DOCUMENTS

| 4,534,622 | 8/1985 | Harada et al. | 350/334 |
| 4,778,258 | 10/1988 | Parks et al. | 350/334 |
| 4,943,143 | 7/1990 | Yamashita | 350/340 |

FOREIGN PATENT DOCUMENTS

| 0136509 | 4/1985 | European Pat. Off. | 350/336 |
| 0098631 | 8/1979 | Japan | 350/340 |
| 0094719 | 6/1982 | Japan | 350/341 |
| 0188968 | 8/1986 | Japan | 357/4 |
| 62-296123 | 12/1987 | Japan . | |
| 3101819 | 5/1988 | Japan | 350/342 |

OTHER PUBLICATIONS

*Patent Abstracts of Japan* (Jun. 25, 1988), vol. 12, No. 224, (p.-721) [3071].
*Patent Abstracts of Japan* (Apr. 26, 1984), vol. 8, No. 91 (E-241) [1528].
*Patent Abstracts of Japan* (Dec. 14, 1985), vol. 9, No. 320 (P-413 [2043].
*Patent Abstracts of Japan* (Mar. 23, 1986), vol. 10, No. 140, (P-458) [2197].
*Patent Abstracts of Japan* (Jun. 12, 1985), vol. 9, No. 137 (P-363 [1860].

*Primary Examiner*—Michael C. Wimer
*Assistant Examiner*—Tan Ho
*Attorney, Agent, or Firm*—Irell & Manella

[57] ABSTRACT

A liquid crystal display apparatus comprising a pair of insulating substrates, a large number of picture element electrodes disposed into a matrix on the inner surface of one of the pair of substrates, a function element electrically connected to each of the picture element electrodes, and a liquid crystal layer charged between the pair of substrates, wherein the display apparatus further comprises on one of the substrate, an insulating protective film made of inorganic nitrides or inorganic oxides the insulating protective film being formed on the picture element electrode except for areas that constitute window regions, and an orientation film of a polyimide resin formed on the entire surface of the insulating protective film and window region, the orientation film has been rubbing-processed, whereby the occurrence of an internal polarization phenomenon can be prevented when a polyimide resin is used for the orientation film.

8 Claims, 7 Drawing Sheets

LIQUID CRYSTAL DISPLAY APPARATUS

BACKGROUND OF THE INVENTION

1. Field of the invention

The present invention relates to a liquid crystal display apparatus in which a liquid crystal layer is driven by a large number of picture element electrodes disposed into a matrix.

2. Description of the prior art:

In an active matrix type liquid crystal display apparatus, a liquid crystal layer is put between a picture element electrode substrate and an opposite electrode substrate so as to form a liquid crystal display cell, the picture element electrode substrate having a large number of picture element electrodes disposed into a matrix on an insulating transparent substrate. Each picture element electrode connects with a function element for applying predetermined voltage. A thin film transistor (TFT), a metal-insulator-metal (MIM) element, a transistor, a diode, a varistor, or the like, is used as the function element connected to the picture element electrode.

An insulating protective film is formed on the entire surface of the picture element electrode substrate except for areas to be connected to external terminals or the like, in order to prevent each picture element electrode and each function element from being mechanically and/or chemically damaged and a leakage current from flowing between the respective picture element electrodes. On the insulating protective film an orientation film is laminated for orienting liquid crystal molecules at the liquid crystal layer, the orientation film being formed by rubbing-processing, for example, a film of polyimide resin.

On the opposite electrode substrate opposite to the picture element electrode substrate across the liquid crystal layer is disposed an opposite electrode. On the entire surface of the opposite electrode is formed an orientation film, which is formed in the same way as on the picture element electrode substrate. The orientation films on the picture element electrode substrate and the opposite electrode substrate enable twist orientation of liquid crystal molecules.

The Japanese Laid-Open Patent Publication No. 62-296123 discloses a display apparatus using a polyimide resin as an insulating protective film on a picture element electrode substrate. In the display apparatus, the insulating protective film of a polyimide resin is laminated not on the entire surface of each picture element electrode, but on part only thereof. The insulating protective film and picture element electrodes are covered with an orientation film of a polyimide resin. The polyimide resin film used for the insulating protective film is defective in that it is rough membraneous that tends to create pinholes therein and high in moisture permeability which tends to leak an electric charge. Therefore, such a polyimide resin film, when used as the insulating protective film for protecting the function element, such as TFT, must be 2 μm or more in thickness. In the above-mentioned Publication, the polyimide insulating protective film is about 2.5 μm in thickness. Since the liquid crystal layer at the liquid crystal display apparatus is usually about 10 μm in thickness, when the polyimide insulating protective film covers the entire surface of picture element electrode, the impedance of the film corresponds to ¼ to ⅓ of the impedance of the liquid crystal layer. In the liquid crystal display apparatus having the insulating protective film of such impedance, voltage loss at the insulating protective film is remarkable, therefore a high voltage must be applied between the picture element electrode and the opposite electrode in order to apply the predetermined voltage to the liquid crystal layer. Such a high voltage will increase the load on the function element, such as TFT, and on wirings, and so remarkably reduce a life span of the liquid crystal apparatus. With the liquid crystal apparatus in the aforesaid publication, if the polyimide insulating protective film is removed from the picture element electrode so as to enable the liquid crystal layer to be driven by a relatively low voltage, the above problem, will be solved.

In the liquid crystal apparatus disclosed in the aforesaid Publication, the polyimide insulating protective film laminated on part of the picture element electrode must be made large in thickness. Therefore, the impedance of the insulating protective film becomes large, so that, when voltage is applied to the picture element electrode in order to drive the liquid crystal layer, a voltage to be applied to the liquid crystal layer in the area of the picture element electrode on which the polyimide insulating protective film is laminated becomes lower than that of the area of the picture element electrode on which the polyimide insulating protective film is not laminated. Thus, contrast unevenness is caused in the picture element driven by one picture element electrode, thereby creating the problem in that the display quality remarkably lowers.

When a polyimide resin is used for the orientation film for the liquid crystal layer, internal polarization is apt to occur between the orientation film and the picture element electrode. The mechanism of the generation of internal polarization is not yet known in detail, but it is assumed to be as follows: The polyimide resin has the following structure with a large number of polar* groups.

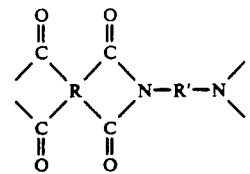

Accordingly, polar molecules or ions are specifically absorbed into the polyimide resin orientation film or onto the surface thereof. It is considered that, since an electric double layer is formed between the absorbed polar molecules or ions and the picture element electrode, the internal polarization is generated. Thus, when the internal polarization is generated, voltage applied to the liquid crystal layer is adversely affected. In other words, the internal polarization superposes a DC offset voltage on an AC voltage that is applied between the picture element electrode and the opposite electrode in order to change the orientation of liquid crystal molecules, thereby putting the AC voltage in the non-equilibrium state. In such a non-equilibrium state, flickering occurs generated on the display picture plane, which causes deterioration in contrast. Moreover, the variation in the superposed DC component causes a contrast ununiformity, which remarkably lowers the display quality. Intensity of such an internal polarization, when the insulating protective film is held between the polyimide resin orientation film and the picture element electrode, is affected by the thickness of the insulating protective film, and it increases with an increase in the thickness of the insulating protective film. In the case where a polyimide resin is used as the insulating protective film in the same manner as that of the liquid crystal display apparatus disclosed in the aforesaid Publication, a film thickness of 2 μm or more is required, whereby, even when the insulating protective film is laminated only on part of the picture element electrode, there is a deterioration of display quality, such as contrast unevenness, caused by the generation of the internal polarization.

When TFT is used as the function element connected to each picture element electrode, a gate voltage that is generated by capacitance formed between a gate electrode and a drain electrode couples with a drain voltage to thereby superpose the DC component on the drain voltage. The DC component is compensated to a certain extent by applying the DC component to the opposite electrode. However, the DC component superposed on the drain electrode largely changes due to the source voltage, so that it cannot be completely compensated. Such an incompletely compensated DC component is applied to the orientation film of a polyimide resin, so that the aforesaid internal polarization further increases. Thus, it takes a long time for the large internal polarization generated by a source voltage applied as the image signal to disappear, and accordingly the internal polarization is stored for a predetermined time. As a result, the orientation of liquid crystal molecules cannot follow a change in the source voltage (i.e., image signal), which results in residual images on the display picture plane. In the active matrix type liquid crystal apparatus using TFT as the function element, the internal polarization is one factor that causes the residual images.

As mentioned above, in the case where the orientation film of a polyimide resin is laminated on the insulating protective film disposed on the picture element electrode the generation of internal polarization creates various problems, but when the orientation film formed of an inorganic material, such as $SiO_2$, or of a silane coupling agent is used, the aforesaid problem is scarcely created.

When the polyimide resin is used as the orientation film, the aforesaid problem is created by the insulating protective film laminated on the picture element electrode. To solve this problem, it was considered to form no insulating protective film. However, when the insulating protective film is not formed, the picture element electrode substrate is apt to suffer mechanical and chemical damage when manufactured. For example, when the orientation film of a polyimide resin is subjected to a rubbing process, the film of the picture element electrode or the like is easy to peel off. Also a leakage current between the respective picture element electrodes increases. For example, a TFT off-current increases to cause a display unevenness, thereby deteriorating the display quality and also the reliability of the display apparatus.

SUMMARY OF THE INVENTION

The liquid crystal display apparatus of this invention, which overcomes the above-discussed and numerous other disadvantages and deficiencies of the prior art, comprises a pair of insulating substrates, a large number of picture element electrodes disposed into a matrix on the inner surface of one of said pair of substrates, a function element electrically connected to each of said picture element electrodes, and a liquid crystal layer charged between said pair of substrates, wherein said display apparatus further comprises on one of said substrate, an insulating protective film made of inorganic nitrides or inorganic oxides said insulating protective film being formed on said picture element electrode except for areas that constitute window regions, and an orientation film of a polyimide resin formed on the entire surface of said insulating protective film and window region, said orientation film has been rubbing-processed.

In a preferred embodiment, a plurality of window regions are provided on each of said picture element electrodes.

In a preferred embodiment, the window region is made elongate in configuration and the lengthwise direction of said window region substantially coincides with the rubbing processing direction of said orientation film.

Thus, the invention described herein makes possible the objectives of (1) providing a liquid crystal display apparatus which can prevent the occurrence of an internal polarization phenomenon when a polyimide resin is used for the orientation film; (2) providing a liquid crystal display apparatus which can restrain the occurrence of an internal polarization phenomenon when a polyimide resin is used as the orientation film and also restrain the generation of defective picture elements due to a leakage current between the picture element electrode and the opposite electrode; (3) providing a liquid crystal display apparatus which, when a polyimide resin is used as the orientation film, can restrain the occurrence of an internal polarization phenomenon and also restrain the generation of defective picture elements due to a leakage current between the picture element electrode and the opposite electrode; and (4) providing a liquid crystal display apparatus which has an orientation film that has been uniformly rubbing-processed.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLES 1 and 2

Figure 1:
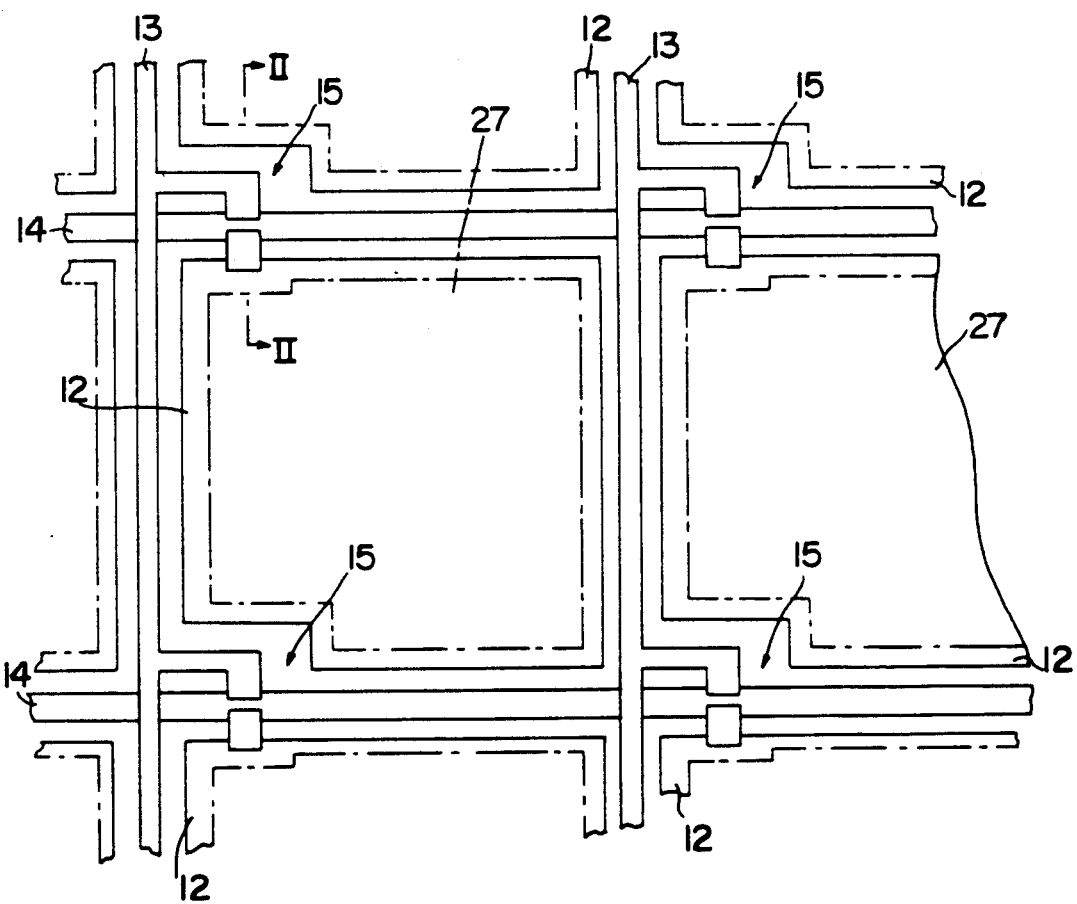
FIG. 1 is a plan view showing the picture element electrode substrate used in a liquid crystal display apparatus of this invention.
Figure 2:
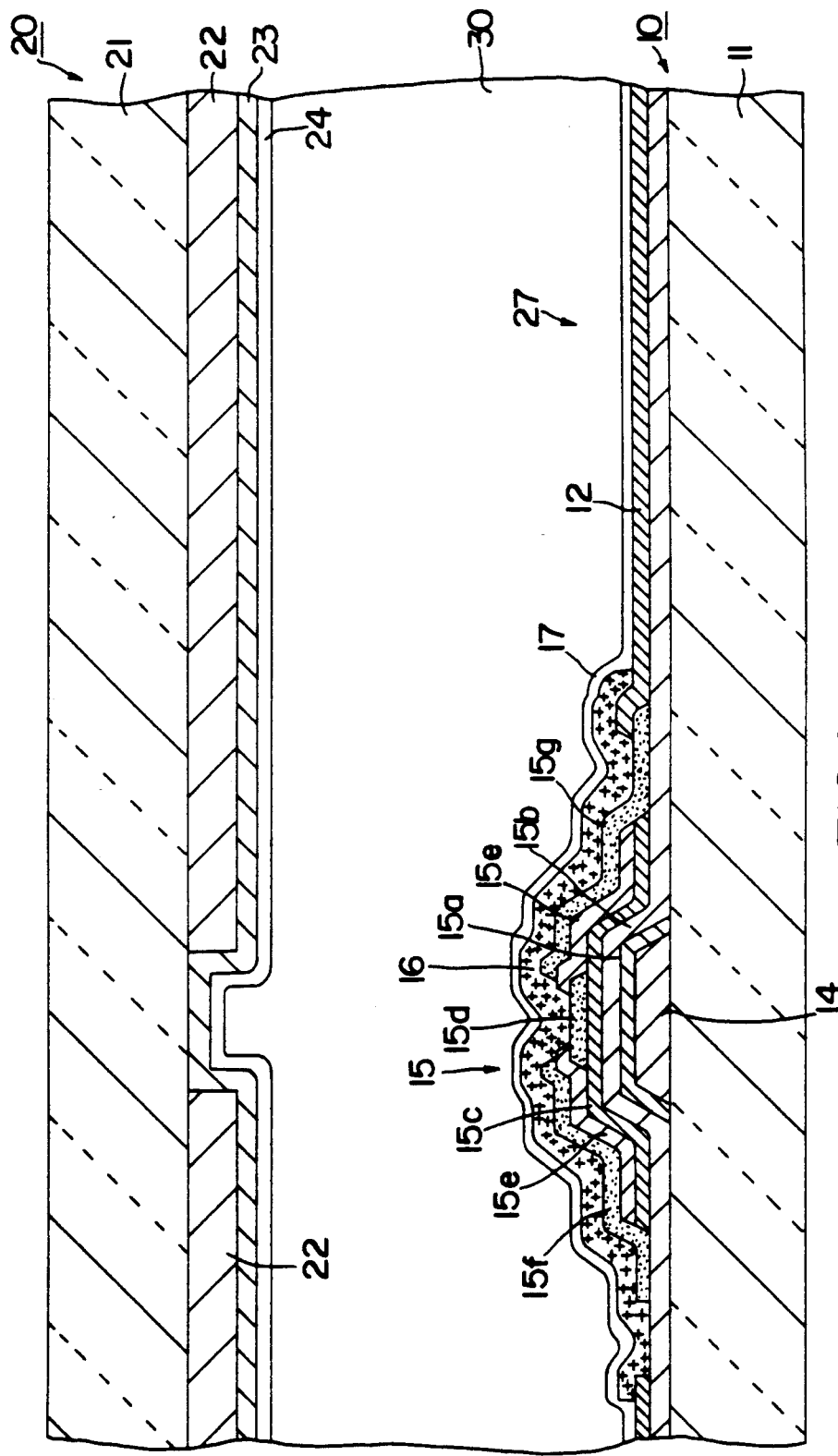
FIG. 2 is a sectional view showing the liquid crystal display apparatus with the picture element electrode substrate of FIG. 1, taken on the line II—II in FIG. 1.

FIG. 1 is a plan view of the picture element electrode substrate used in a liquid crystal display apparatus of the invention and FIG. 2 is a sectional view thereof taken on the line II—II in FIG. 1. The liquid crystal display apparatus, as shown in FIG. 2, has a picture element electrode substrate 10 on which a large number of picture element electrodes 12 composed of an ITO film and an opposite electrode substrate 20 disposed opposite to the picture element electrode substrate 10 across a liquid crystal layer 30. At the picture element electrode substrate 10, as shown in FIG. 1, a large number of source bus wirings 13 made of titanium (Ti) are provided in parallel to each other on a transparent substrate 11 and a large number of gate bus wirings 14 made of tantalum (Ta) are provided to perpendicularly intersect the source bus wiring 13 in a mutual insulating state. In an area surrounded by the respective source bus wirings 13 and gate bus wirings 14 is housed each picture element electrode 12, and a large number of picture element electrodes are disposed on the transparent substrate 11 into a matrix, resulting in the desired pattern.

A TFT 15 that acts as a function element is provided in the vicinity of the intersection of each gate bus wiring 14 and each source bus wiring 13, each TFT 15, the predetermined picture element electrode 12 being electrically connected to each other.

Each TFT 15 and each picture element electrode 12 are concretely constructed as follows: As shown in FIG. 2, part of gate bus wiring 14 of tantalum provided on the transparent substrate 11 functions as a gate electrode. On the gate bus wiring 14 is formed an anodic oxidation film 15a of tantalum oxide that is obtained by anodic-oxidizing the surface of gate bus wiring 14. The anodic oxidation film 15a also functions as a gate insulating film. A gate insulating film 15b made of silicon nitride (SiNx) is formed on the anodic oxidation film 15a in a manner to cover the entire surface of transparent substrate 11.

The part of each gate bus wiring 14 functioning as the gate electrode is coated with a semiconductor layer 15c of intrinsic semiconductor a-Si (amorphous silicon) in a manner to sandwich the anodic oxidation film 15a and the gate insulating film 15b therebetween. A semiconductor layer protective film (on an insulating layer) 15d is laminated on the central portion of the semiconductor layer 15c except for both sides thereof. At both sides of the semiconductor layer protective film 15d except for the central portion thereof are laminated a pair of contact layers 15e of a-Si (n+), the respective contact layers 15e being laminated on the semiconductor layer 15c except for part on which the semiconductor layer protective film 15d is laminated.

On one contact layer 15e is laminated a source electrode 15f extending from the source bus wiring 13, the source electrode 15f extending above the gate insulating film 15b.

On the other contact layer 15e is laminated a drain electrode 15g composed of titanium, which extends above the gate insulating film 15b. Part of picture element electrode 12 is laminated on the drain electrode 15g laminated above the gate insulating film 15b, the picture element electrode 12 being laminated on the gate insulating film 15b except for part of the picture element electrode 12 laminated on the drain electrode 15g.

Each TFT 15 with such a construction is electrically connected with the source bus wiring 13 and gate bus wiring 14 and also with the picture element electrode 12.

Each gate bus wiring 14, each source bus wiring 13, each TFT 15, and part of the picture element electrode 12, except for connections to the external terminals, are coated with an insulating protective film 16 made of, for example, SiNx. The insulating protective film 16 is laminated to coat only the peripheral portion of the picture element electrode 12 except for the window region 27 that is shaped as shown by the one-dot chain line in FIG. 1. The entire insulating protective film 16 and window region 27 is laminated with an orientation film 17 made of polyimide resin (for example, optomer AL manufactured by Japan Synthetic Rubber Co., Ltd.) with a thickness of 600 Å. Accordingly, the orientation film 17 is formed on the entire surface of the picture element electrode substrate 10.

The picture element electrode substrate 10 with such a construction was produced according to the following well-known process. In detail, tantalum (Ta) is laminated in 3000 Å thickness by the spattering method on the transparent substrate 11. The tantalum metal layer is then patterned by a photoetching technique, resulting in the gate bus wiring 14, part of which functions as the gate electrode. Next, the anodic oxidation forms on the gate bus wiring 14 the anodic oxidation film 15a of $Ta_2O_5$ with a thickness of 2000 Å. The gate insulating film 15b of SiNx of 2000 Å in thickness is laminated by the plasma CVD method on the entire surface of anodic oxidation film 15a. On the entire surface of the gate insulating film 15b are laminated an intrinsic semiconductor amorphous silicon (a-Si(i)) layer (which becomes the semiconductor layer 15c) in thickness of 300 Å, after which an SiNx layer (which becomes the insulating layer 15d) in thickness of 2000 Å is continuously deposited thereon. The SiNx layer is then patterned in a predetermined configuration to retain only the upper portion of the gate bus wiring 14 that functions as the gate electrode, thereby forming the insulating layer 15d.

On the entire surface covering the insulating layer 15d is laminated to a thickness of 400 Å an a-Si (n+) layer that serves as the contact layer 15e later, by the plasma CVD method. Next, the a-Si (n+) layer and the aforesaid a-Si(i) layer are subjected to a predetermined patterning to thereby form the semiconductor layer 15c and the contact layer 15e. The contact layer 15e is provided for ohmic contact between the semiconductor layer 15c and the source electrode 15f and drain electrode 15g, at which time the contact layer 15e continues on the insulating layer 15d.

A metal layer of Ti metal or Mo metal is deposited in thickness of 3000 Å by the sputtering method on the entire surface of the substrate, the metal layer being patterned by an etching technique to form the source electrode 15f and drain electrode 15g, at which time, the contact layer 15e disposed on the insulating layer 15d is simultaneously removed and divided into two parts, one of which is positioned below the source electrode 15f, and the other of which is below the drain electrode 15g, resulting in the TFT 15. Also, the source bus wiring 13 is formed simultaneously with the source electrode 15f and drain electrode 15g. Accordingly, the source bus wiring 13 intersects the gate bus wiring 14 in a manner to sandwich the gate insulating film 15b and the anodic oxidation film 15a therebetween.

Next, an ITO film is laminated in thickness of 1000 Å on the entire surface of transparent substrate 11 by the sputtering method, and patterned in a predetermined configuration to form the picture element electrode 12.

On the transparent substrate 11 on which the gate bus wiring 14, source bus wiring 13, TFT 15 and picture element electrode 12 are formed in such a way, a silicon nitride (SiNx) film, later to be the insulating protective film, is formed to a thickness of 5000 Å by, for example, CVD. The SiNx film is coated with a photoresist and a mask is superposed thereon and exposed to light (mask exposure). Next, portions of the SiNx film, which is laminated at the window region 27 at the picture element electrode 12 and laminated at the areas such as those connected with the external terminals, are removed by an etching technique using hydrofluoric acid, resulting in the insulating protective film 16. Thereafter, a polyimide resin film is laminated on the entire surface of the insulating protective film 16 and the entire area of the window region 27, to form the orientation film 17.

With an opposite electrode substrate 20 disposed opposite to the picture element electrode substrate 10, on a transparent substrate 21, color filters 22 for the three primary colors of red (R), green (G) and blue (B) are disposed opposite to the respective picture element electrodes 12. An opposite electrode 23 formed by laminating, for example, by an ITO film of 600 Å in thickness by the sputtering method is provided so as to coat all the color filters 22 therewith. On the opposite electrode 23 is laminated an orientation film 24 made of a polyimide resin.

The orientation film 24 is formed as follows: For example, a polyimide resin that is similar to that of the orientation film 17 is patterned by an offset printing technique and thereafter subjected to a heat treatment at 200° C. for one hour and further to a rubbing processing by nylon woven fabric, and then washed with a fluorocarbon solvent, resulting the orientation film 24.

The picture element electrode substrate 10 and the opposite electrode substrate 20 are disposed with a proper gap therebetween and sealed at the peripheral edges of both the substrates so that liquid crystal is charged into the gap therebetween to form the liquid crystal layer 30.

In this liquid crystal display apparatus, each TFT 15 is switched on by a scanning signal input from each gate bus wiring 14. A predetermined voltage is applied to each picture element electrode 12 on the basis of display data signal that is input from each source bus wiring 13, so that the orientation state of liquid crystal molecules at a portion (i.e., a picture element) of the liquid crystal layer 30 positioned between the picture element electrode 12 to which the predetermined voltage is applied and the opposite electrode 23 opposite to the picture element electrodes 12.

Since the orientation film 17 of a polyimide resin is directly laminated at the window region 27, even when the predetermined voltage is applied, the generation of internal polarization is restrained. The insulating protective film 16, which is interposed between the picture element electrode 12 and the orientation film 17 at the peripheral portion of each picture element electrode 12 except for the window region 27, is constituted of an SiNx film with a dense membrane and a high moisture-proof as well as a high dielectric constant, so that its film thickness is reducible up to about 2000 Å. Accordingly, even at the portion of orientation film 17 laminated on the insulating protective film 16, the generation of internal polarization is restrained. Moreover, the voltage applied to each picture element of the liquid crystal layer 30, by means of each picture element electrode 12 on which the insulating protective film is laminated, is almost equal to the voltage applied to each picture element of the liquid crystal layer 30 by means of each picture element electrode 12 that corresponds to the window region 27 on which the polyimide orientation film 17 is directly laminated. Therefore, there is no fear that flickering is created on the display picture plane, whereby high quality images free from lowering of contrast or contrast unevenness are obtainable.

When an area of the window region 27 on which the polyimide orientation film 17 is directly laminated on each picture element electrode 12 without interposing the insulating protective film therebetween is 1/100 or more of the entire area of each picture element electrode 12, the generation of internal polarization can be restrained. The larger this ratio of the area of window region is, the greater the effect is. The ratio of 1/30 or more can obtain a sufficient effect. It is considered that the generation of internal polarization can be restrained because ions, polar molecules, or the like, gather at the window region 27 on which the picture element electrode 12 and polyimide orientation film 17 are directly laminated without interposing an insulating therebetween.

Figure 3:
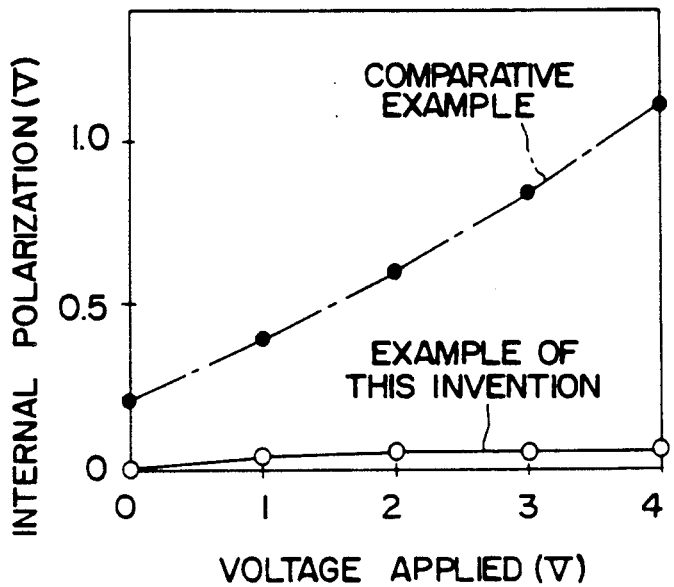
FIG. 3 is of a graph showing the generation state of an internal polarization when a DC voltage is applied to a picture element electrode of the display apparatus of FIG. 2.

The generating state of internal polarization at the above-mentioned liquid crystal display apparatus of the invention was examined. The results are shown in FIG. 3. The internal polarization is measured by applying a predetermined DC voltage to the apparatus for 30 minutes and by evaluating a voltage that is needed to eliminate flickering. The generating state of internal polarization can be also evaluated by manufacturing simple liquid crystal cells that have no function element, such as TFT, and by applying from the outside a dummy voltage to the electrodes holding the liquid crystal layer therebetween. As a comparative example, a liquid crystal display apparatus in which the insulating protective film 16 of SiNx is provided on all the TFTs and picture element electrodes, in other words, no window region 27 is provided, was produced and the internal polarization thereof was also measured and the results are shown together in FIG. 3, in which OV indicates the initial state. The present embodiment scarcely generates internal polarization.

When the polyimide orientation film 17 is made with a thickness of about 300 to 1000 Å, preferably 600 to 800 Å, the characteristics of the display apparatus are not affected by the thickness of the insulating protective film 16. The material for the insulating protective film is not limited to inorganic nitride, such as SiNx, but may be inorganic oxide, such as $SiO_2$, $Ta_2O_5$, $Al_2O_3$, $Y_2O_3$, or $TiO_2$. As the polyimide resin used for the orientation film, any high molecular resin with imide groups can be employed.

With the liquid crystal display apparatus shown in FIGS. 1 and 2, display unevenness caused by an off-characteristic deterioration of TFT 15, a lowering of polarization display quality (flickering, contrast unevenness, or the like) caused by the internal polarization and residual images, were examined. The results are shown in Example 1 in Table 1. For comparison, the apparatus of FIG. 2 was modified in various ways as follows: An apparatus (Example 2) was made in which an insulating protective film of $SiO_2$ of 2000 Å in thickness is provided between the opposite electrode 23 at the opposite electrode substrate 20 and the polyimide orientation film 24. An apparatus (Comparative example 1) was made in which an insulating film is provided on neither a picture element electrode substrate nor an opposite electrode substrate. An apparatus (Comparative example 2) was made in which an insulating protective film for the picture element electrode substrate covers the entire surface of each picture element electrode and the opposite electrode substrate is provided with an insulating protective film. An apparatus (Comparative example 3) was made with the same construction as that of Comparative example 2 except that no insulating protective film is provided at the opposite electrode substrate. The display unevenness caused by an off-characteristic deterioration of TFT, a lowering of display quality, and residual images, are examined, the results of which are showed together in Table 1.

TABLE 1

|  |  | Examples of this invention | | Comparative Examples | | |
| --- | --- | --- | --- | --- | --- | --- |
|  |  | 1 | 2 | 1 | 2 | 3 |
| Insulating protective films | On the picture element electrode | partially | partially | no | entire | entire |
|  | On the opposite electrode substrate | no | exist | no | exist | exist |
| Prevention of an off-characteristic deterioration of TFT |  | ⊚ | ⊚ | X | ⊚ | ⊚ |
| Prevention of a lowering of display quality by internal polarization |  | ⊚ | ○ | ⊚ | △ | △ |
| Prevention of residual images |  | ⊚ | ○ | ⊚ | ○ | △ |

⊚ ... excellent, ○ ... good, △ ... poor, X ... not effective

As seen from Table 1, the liquid crystal display apparatus of the invention scarcely generates the display unevenness caused by an off-characteristic deterioration of TFT, a lowering of display quality caused by internal polarization and residual images, thereby attaining an excellent display.

An even better display can be attained when no insulating protective film is interposed between the opposite electrode and the polyimide orientation film at the opposite electrode substrate. Also, when $SiO_2$ is used for the insulating protective film on the picture element electrode substrate, the same results as the above are obtained.

As mentioned above, in the liquid crystal display apparatus of this invention, the insulating protective film made of inorganic nitrides or inorganic oxides, is laminated on only part of each picture element electrode except for the window region, and the orientation film of a polyimide resin is laminated on both the insulating protective film and the picture element electrode. Such a construction restrains the internal polarization from being generated in the window region wherein the orientation film of a polyimide resin is directly laminated at the picture element electrode. In addition to this, the insulating protective film positioned between the orientation film and the picture element electrode is made of inorganic nitrides or inorganic oxides and relatively smaller in thickness, so that even at part on which the insulating protective film is laminated, the generation of internal polarization is restrained.

Moreover, a voltage applied from each picture element electrode to the liquid crystal layer is also uniformed, so that the display image is prevented from generating flickering, resulting in images of high quality and free from a contrast lowering or a contrast unevenness.

However, according to the above-mentioned construction, when a foreign object enters into the liquid crystal layer and is positioned between the window region on the picture element electrode and the opposite electrode, both the electrodes and the foreign object are brought into contact with each other by means of the orientation film of a polyimide resin, therefore a leakage current may flow between both the electrodes. When such a leakage current flows, a voltage is not sufficiently applied to the liquid crystal layer corresponding thereto, which makes the corresponding picture element defective, causing a lowering of display quality of the liquid crystal display apparatus and moreover a lowering of the production yield thereof.

EXAMPLES 3 and 4

Figure 4:
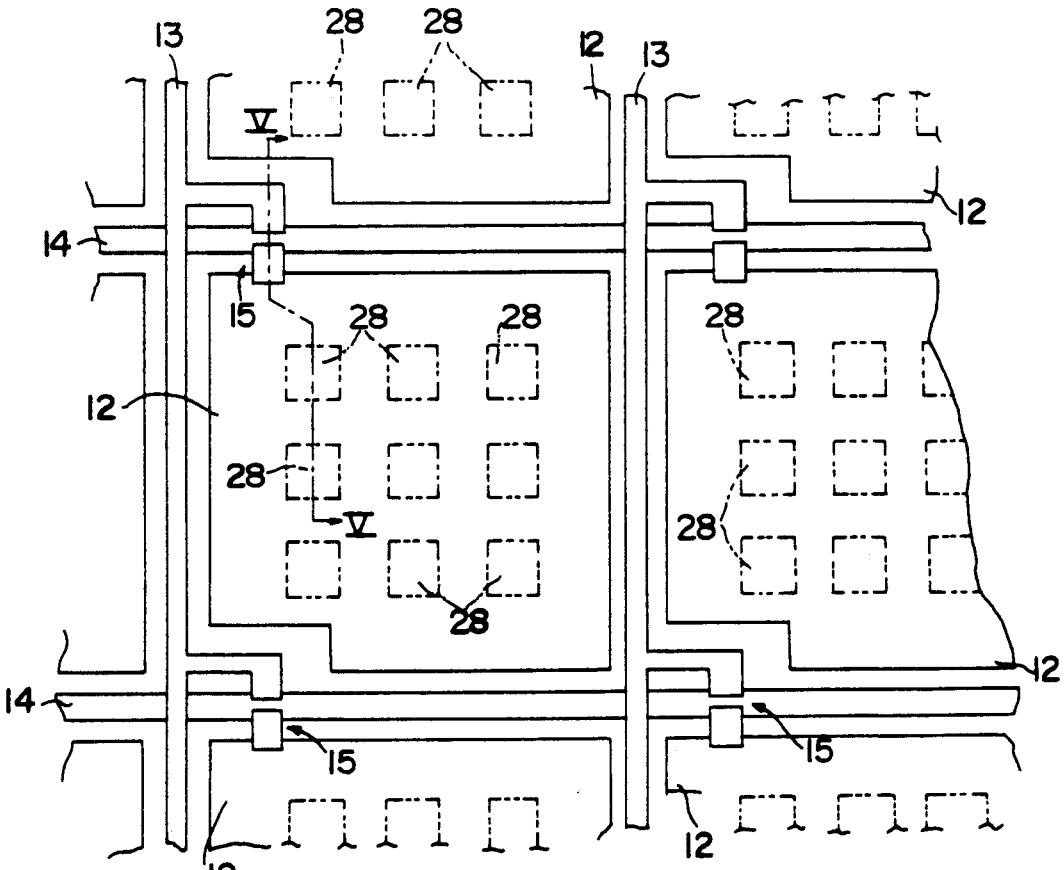
FIG. 4 is a plan view showing the picture element electrode substrate used in another liquid crystal display apparatus of this invention.

The liquid crystal display apparatuses in these Examples in which a polyimide resin film is used as the orientation film can restrain an occurrence of the internal polarization phenomenon and an occurrence of defective picture elements due to a leakage current between the picture element electrodes and the opposite electrode. FIG. 4 is a plan view of a picture element electrode substrate constituting the liquid crystal display apparatus of Example 3, and FIG. 5 is a sectional view of the liquid crystal display apparatus using the picture element electrode substrate of FIG. 4, taken on the line V—V in FIG. 4.

The apparatus of Example 3 is the same as that of Example 1 shown in FIG. 1 except that the configuration and number of window regions 28 are different from those in FIG. 1. As shown in FIG. 4, the insulating protective film 16 is laminated on each picture element electrode 12 except for nine rectangular window regions 28 shown by the two-dot chain line and disposed longitudinally and laterally in each three lines spaced at proper intervals respectively. An orientation film 17 of a polyimide resin is laminated throughout the entire surface of the insulating protective film 16, which is disposed on the transparent substrate 11, and the entire surface of the window regions 28 which is not coated with the insulating protective film 16. Accordingly, at a plurality of window regions 28 at each picture element electrode 12 is directly laminated the orientation film 17 of a polyimide resin without interposing the insulating protective film 16 therebetween.

In this embodiment, since the orientation film 17 of a polyimide resin is directly laminated on the plurality of window regions 28 on each picture element electrode 12, even when a predetermined voltage is applied to each picture element electrode 12, the generation of internal polarization is restrained. When the total amount of area of the window regions positioned on each picture element electrode 12 is 1/100 or more of the area thereof, the generation of internal polarization can be restrained. When the generating state of internal polarization at this embodiment of the liquid crystal display apparatus was examined in the same way as that of the embodiment of FIG. 1, the same results as those of the embodiment of FIG. 3 was obtained, indicating that the internal polarization is scarcely generated in this embodiment also.

Figure 5:
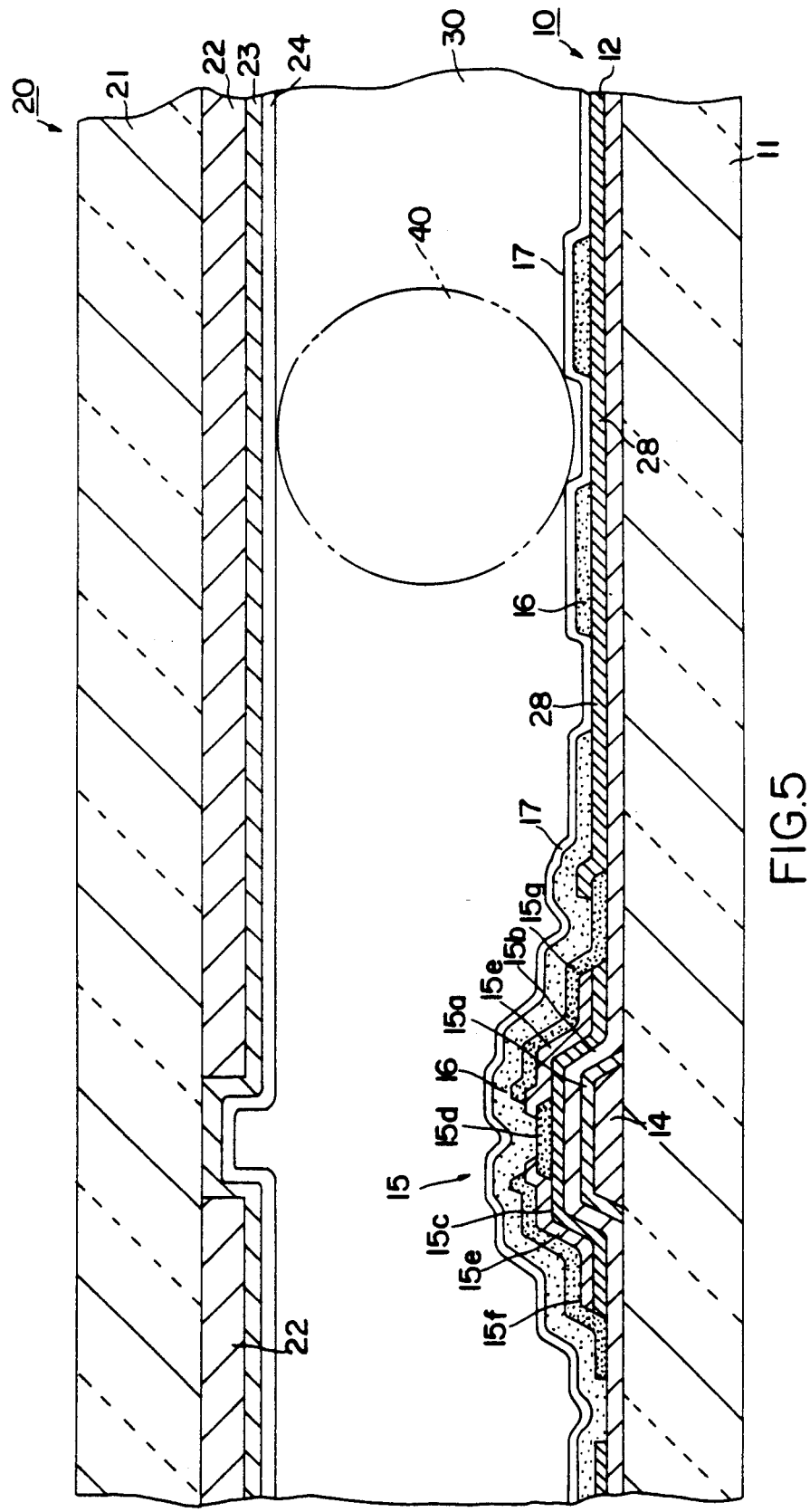
FIG. 5 is a sectional view showing the liquid crystal display apparatus with the picture element electrode substrate of FIG. 4, taken on the line V—V in FIG. 4.

Moreover, in the liquid crystal display apparatus of the invention, since a plurality of window regions 28 in which the orientation film 17 is directly laminated on the picture element electrode 12 without interposing the insulating protective film 16 therebetween used, even though a foreign object enters into the liquid crystal layer 30, as shown by the two-dot chain line in FIG. 5, there is almost no chance that the foreign object 40 will contact the orientation film 17 that is directly laminated on the window region 28 of the picture element electrode 12. Moreover, the polyimide orientation film 17 and the insulating protective film 16 are interposed between the foreign object 40 and the picture element electrode 12, so that the occurrence of a leakage current between the picture element electrode 12 and the opposite electrode 23 due to the foreign object 40 can be prevented.

The display unevenness caused by an off-characteristic deterioration of TFT 15, a lowering of display quality (flickering or contrast) due to the internal polarization, and residual images in the embodiment of the liquid crystal display apparatus shown in FIGS. 4 and 5 were examined. The results are shown in Table 2. For comparison, an apparatus (Example 4) in which an $SiO_2$ insulating protective film of 2000 Å in thickness is provided between the opposite electrode 23 and the polyimide orientation film 24 at the opposite electrode substrate 20 in FIG. 5 was manufactured. As Comparative example 4, an apparatus in which the insulating protective film is not disposed on the picture element electrode nor on the opposite electrode substrate was manufactured. As Comparative example 5, an apparatus in which the insulating protective film for the picture element electrodes is laminated on the entire surface of each picture element electrode and the insulating protective film is provided at the opposite electrode substrate was manufactured. As Comparative example 6, an apparatus which has the same construction as that of Comparative example 2 except that the insulating protective film is not provided at the opposite electrode substrate was manufactured. The display unevenness caused by an off-characteristic deterioration of TFT, a lowering of display quality caused by the internal polarization, and residual images were examined with the above-mentioned apparatuses, the results of which are also shown in Table 2.

TABLE 2

|  |  | Examples of this invention |  | Comparative Examples |  |  |
|---|---|---|---|---|---|---|
|  |  | 3 | 4 | 4 | 5 | 6 |
| Insulating protective films | On the picture element electrode | partially | partially | no | entire | entire |
|  | On the opposite electrode substrate | no | exist | no | exist | exist |
| Prevention of an off-characteristic deterioration of TFT |  | ⊚ | ⊚ | X | ⊚ | ⊚ |
| Prevention of a lowering of display quality by internal polarization |  | ⊚ | ○ | ⊚ | Δ | Δ |
| Prevention of residual images |  | ⊚ | ○ | ⊚ | ○ | Δ |

⊚ ... excellent, ○ ... good, Δ ... poor, X ... not effective

Thus, the liquid crystal display apparatus of the invention scarcely generates the display unevenness caused by an off-characteristic of TFT, a lowering of display quality, and residual images, and excellent display is obtained.

In addition, as described in the FIG. 1 embodiment, the apparatus in these examples provides a better display when no insulating protective film is interposed between the opposite electrode and the polyimide resin orientation film. Also, when $SiO_2$ is used as the insulating protective film, the same results as the above-mentioned were obtained.

As mentioned above, the liquid crystal apparatus of the present invention can restrain generation of internal polarization by means of a plurality of window regions, and moreover even when a foreign object enters into the liquid crystal layer, the picture element electrode and the opposite electrode scarcely cause a leakage current therebetween. The insulating protective film, which coats the function element at the picture element electrode substrate, can protect each function element and prevent the leakage current from generating between the respective picture element electrodes.

The liquid crystal display apparatus of this invention has the region wherein the insulating protective film is formed on the picture element electrodes and the window regions wherein the same is not provided, and accordingly the surface of the orientation film to be formed thereon becomes uneven. When the orientation film, the surface of which has such an unevenness, is rubbing-processed, part thereof is not sufficiently processed. Such a part may disturb the orientation of the liquid crystal layer, which may cause a lowering of display quality of the liquid crystal display apparatus.

EXAMPLE 5

Figure 6:
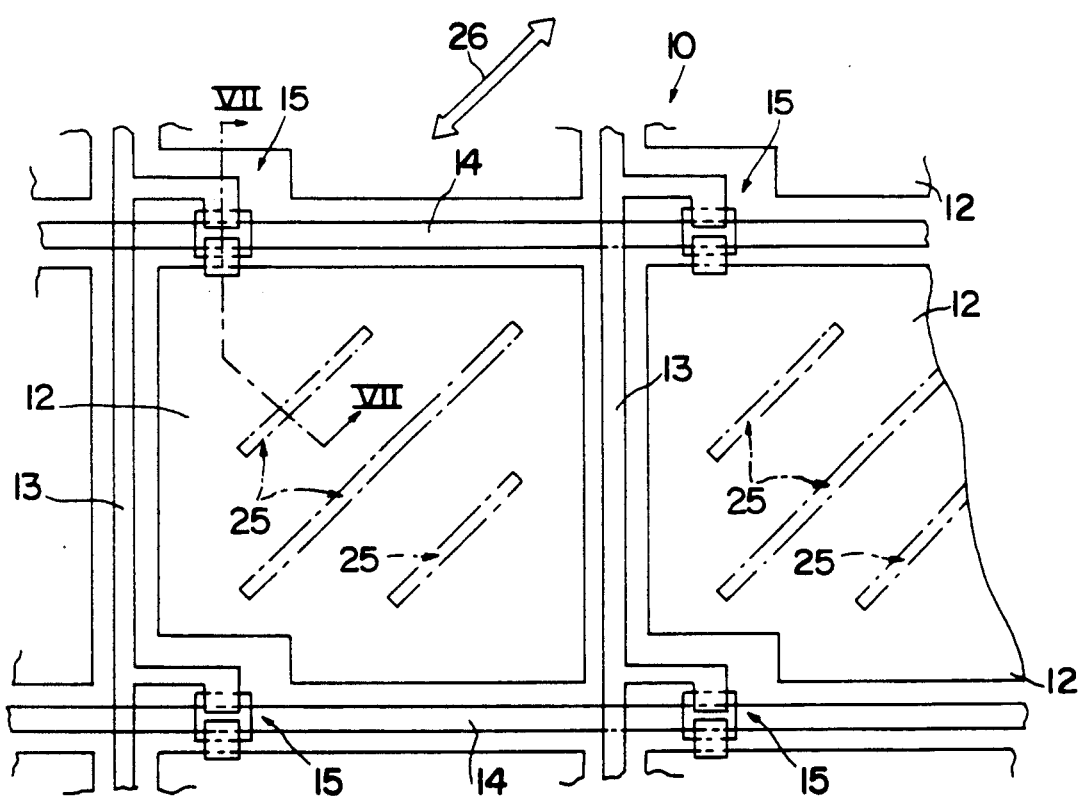
FIG. 6 is a plan view showing the picture element electrode substrate used in another liquid crystal display apparatus of this invention.
Figure 7:
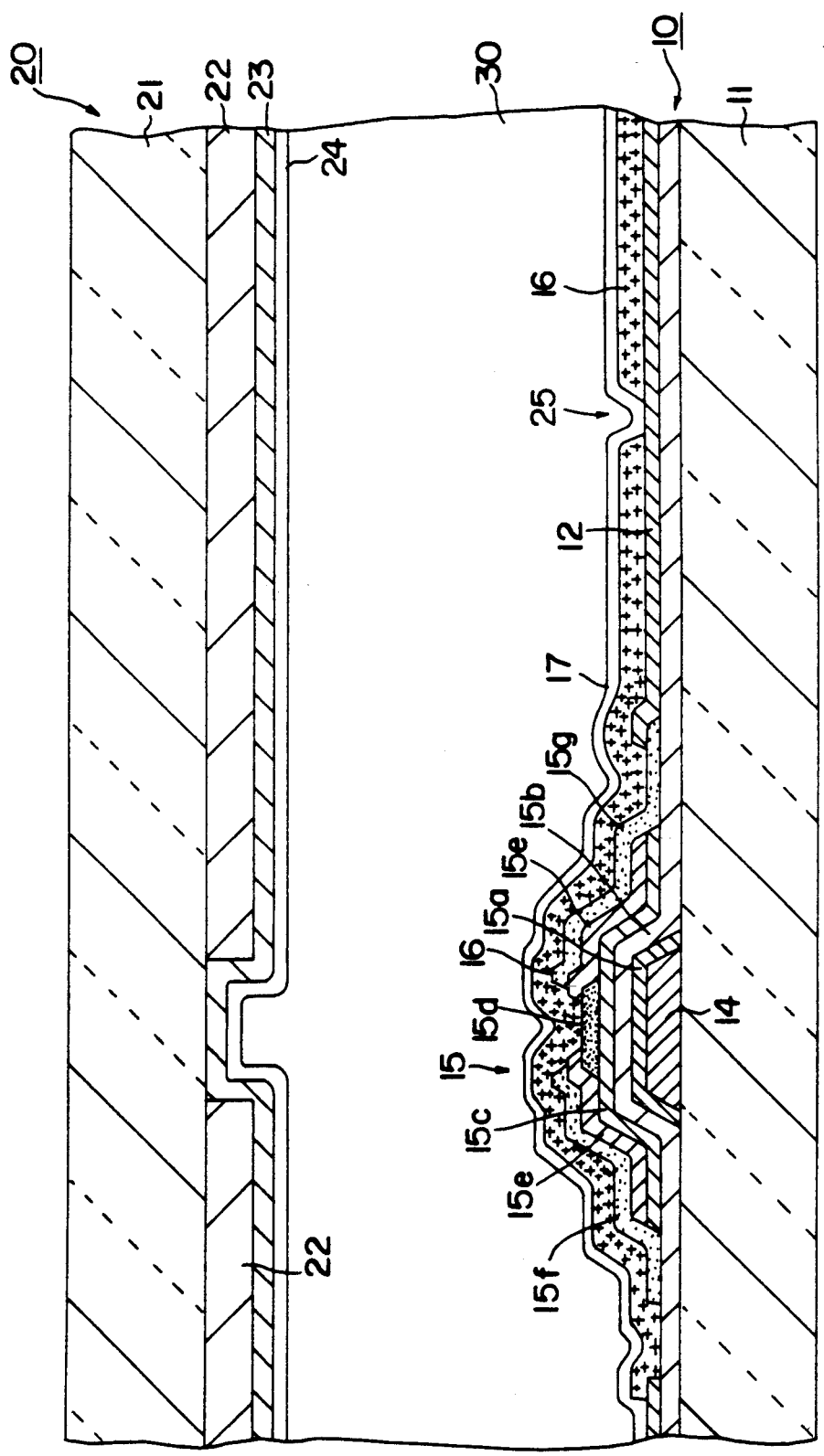
FIG. 7 is a sectional view showing the liquid crystal display apparatus with the picture element electrode substrate of FIG. 6, taken on the line VII—VII in FIG. 6.

This embodiment of the liquid crystal display apparatus uses a polyimide resin as the orientation film and can restrain an occurrence of the internal polarization phenomenon and also a generation of defective picture elements due to a leakage current between the picture element electrode and the opposite electrode. Moreover, the display apparatus has the orientation film, the surface of which has been uniformly rubbing-processed. FIG. 6 is a plan view of a picture element electrode substrate constituting the liquid crystal display apparatus of this embodiment. FIG. 7 is a sectional view of the liquid crystal display apparatus of this embodiment using the substrate of FIG. 6, taken on the line VII—VII in FIG. 6.

This embodiment is the same as the FIG. 1 embodiment except that each window region 25 is different therefrom in configuration and the number. As shown in FIG. 6, on each picture element electrode 12 are provided three elongated window regions 25 per one picture element electrode 12, which are disposed substantially in the direction of the diagonal line of the picture element electrode 12. The lengthwise direction of each elongated window region 25 coincides with the rubbing processing direction shown by arrow 26 of an orientation film 17 of a polyimide resin to be formed later. The window regions 25 each are 7 μm in width, among which the central longest window region is 130 μm in length, other two short ones each being 65 μm in length. The orientation film 17 is subjected to the rubbing processing lengthwise of the window region 25, thereby being processed uniformly.

In this embodiment, the window region 25 is also provided without the insulating protective film 16, thereby not generating the internal polarization. When the generating state of internal polarization of the liquid crystal display apparatus at this embodiment was examined in the same way as that of the FIG. 1 embodiment, the same results as the FIG. 3 embodiment were obtained. Also, in this embodiment, the generation of flickering or contrast deterioration is prevented. Since the region having no insulating protective film in this embodiment is the elongate window region 25, a conductive foreign object included in liquid crystal is scarcely generates a leakage current between the picture element electrode 12 and the opposite electrode 23.

Moreover, the lengthwise direction of the window region 25 coincides with the rubbing processing direction of the orientation film 17, so that the rubbing processing for the orientation film 17 can be uniformly performed. Accordingly, the lowering of image quality due to poor orientation of liquid crystal molecules can be prevented.

Figure 8A:
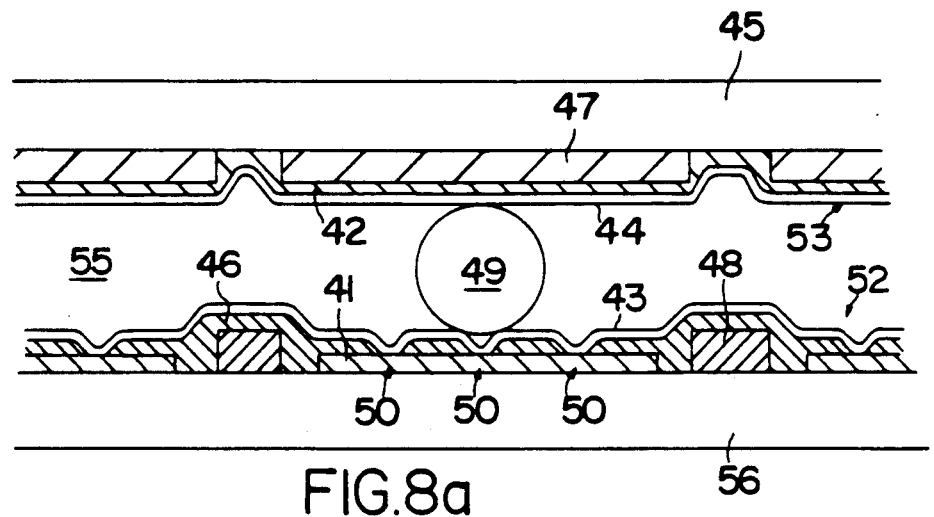
FIGS. 8a and 8b are schematic diagrams showing the relationship between the configuration of the window regions and the generation of a leakage current due to the entrance of foreign objects into the liquid crystal layer.
Figure 8B:
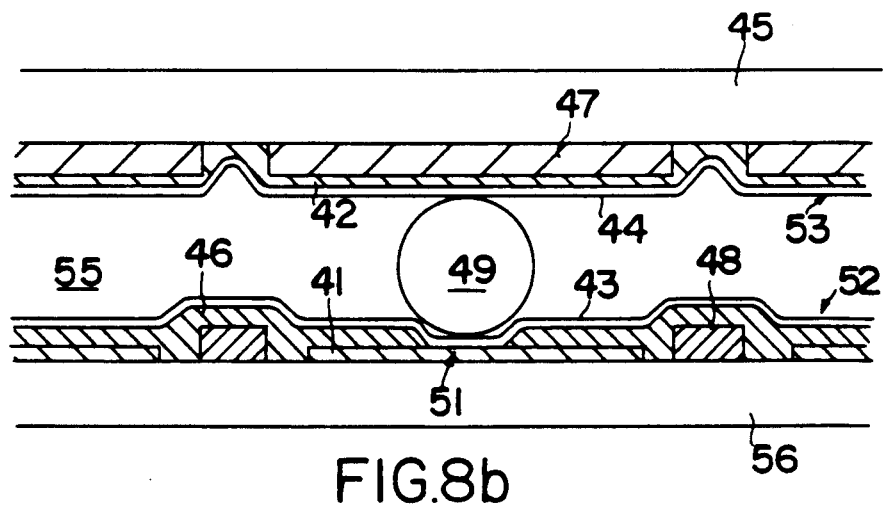

FIG. 8a is a schematic diagram showing the state where the elongate window region in Example 5 prevents the leakage current from generating. For comparison, FIG. 8b is a schematic diagram, in which the window region forms a large region. The description herein is applicable to a mechanism for preventing the leakage current from generating due to the entrance of foreign objects into the liquid crystal in Examples 3 and 4. In FIG. 8a, a picture element electrode 41 and a function element 48 are provided on an insulating substrate 56 and an insulating protective film 46 is deposited thereon, the insulating protective film 46 being deposited on the region except for a plurality of elongate window regions 50 that are disposed on the picture element electrode 41. The orientation film 43 is deposited on the entire surface of insulating protective film 46, so that a picture element electrode substrate 52 is constituted. At an opposite electrode substrate 53 opposite to the picture element electrode substrate 52, color filters 47 are formed on an insulating substrate 45 and an opposite electrode 42 is formed on the entire surfaces of color filters 47. Furthermore, an orientation film 44 is formed on the entire surface of the opposite electrode 42, a liquid crystal 55 being charged between the picture element electrode substrate 52 and the opposite electrode substrate 53.

In such a liquid crystal display apparatus, when a conductive foreign object 49 is included in the liquid crystal layer, the foreign object 49 is electrically connected with the opposite electrode 42 on the opposite electrode substrate 53 through the orientation film 44. However, each window region 50 through which the orientation film 43 contacts the picture element electrode substrate 52 is smaller in width, so that the foreign object 49 is not electrically connected with the picture element electrode 41. In other words, an electrically insulating state is kept between the picture element electrode 41 and the opposite electrode 42. Accordingly, no leakage current is caused by the foreign object 49.

On the other hand, as shown in FIG. 8b, in a display apparatus having a large window region 51 where no insulating protective film is formed on the picture element electrode 41, the conductive foreign object 49 is put in condition to electrically connect with the picture element electrode 41 on the picture element electrode substrate 52 through the orientation film. Accordingly, the picture element electrode 41 and opposite electrode 42 are electrically connected therebetween, thereby generating a leakage current between the electrodes.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid crystal display apparatus comprising a pair of insulating substrates, a large number of picture element electrodes disposed into a matrix on the inner surface of one of said substrates, a function element electrically connected to each of said picture element electrodes, and a liquid crystal layer charged between said pair of substrates, wherein said display apparatus further comprises on one said substrate, an insulating protective film made of an inorganic nitride, said insulating protective film being formed on said picture element electrode except for areas that constitute window regions, and an orientation film of a polyimide resin formed on the entire surface of said insulating protective film and window region, wherein said orientation film has been rubbing-processed in a first direction.

2. A liquid crystal display apparatus according to claim 1, wherein said window region is made elongate in configuration, thereby defining a lengthwise direction of said window region which substantially coincides with said first direction.

3. A liquid crystal display apparatus, comprising a pair of insulating substrates, a large number of picture element electrodes disposed into a matrix on the inner surface of one of said substrates, a function element electrically connected to each of said picture element electrodes, and a liquid crystal layer charged between said pair of substrates, wherein said display apparatus further comprises on one said substrate, an insulating protective film made of an inorganic nitride, said insulating protective film being formed on said picture element electrode except for areas that constitute window regions, and an orientation film of a polymide resin formed on the entire surface of said insulating protective film and window region, wherein said orientation film has been rubbing-processed in a first direction, wherein a plurality of window regions are provided on each of said picture element electrodes.

4. A liquid crystal display apparatus according to claim 3, wherein said window region is made elongate in configuration, thereby defining a lengthwise direction of said window region which substantially coincides with said first direction.

5. A liquid crystal display apparatus comprising a pair of insulating substrates, a large number of picture element electrodes disposed into a matrix on the inner surface of one of said substrates, a function element electrically connected to each of said picture element electrodes, and a liquid crystal layer charged between said pair of substrates, wherein said display apparatus further comprises on one said substrate, an insulting protective film being formed on said picture element electrode except for areas that constitute window regions, and an orientation film of a polyimide resin formed on the entire surface of said insulating protective film and window region, wherein said orientation film has been rubbing-processed in a first direction.

6. A liquid crystal display apparatus according to claim 5, wherein said window regions are made elongate in configuration, thereby defining lengthwise direction of said window regions which substantially coincide with said direction.

7. A liquid crystal display apparatus, comprising a pair of insulating substrates, a large number of picture element electrodes disposed into a matrix on the inner surface of one of said substrates, a function element electrically connected to each of said picture element electrodes, and a liquid crystal layer charged between sai pair of substrates, wherein said display apparatus further comprises on one said substrate, an insulating protective film made of an inorganic oxide, said insulating protective film being formed on said picture element electrode except for areas that constitute window regions, and an orientation film of a polyimide resin formed on the entire surface of said insulating protective film and window region, wherein said orientation film has been rubbing-processed in a first direction, wherein a plurality of window regions are provided on each of said picture element electrodes.

8. A liquid crystal display apparatus according to claim 7, wherein said window regions are made elongate in configuration, thereby defining lengthwise direction of said window regions which substantially coincide with said direction.

* * * * *